UNITED STATES PATENT OFFICE.

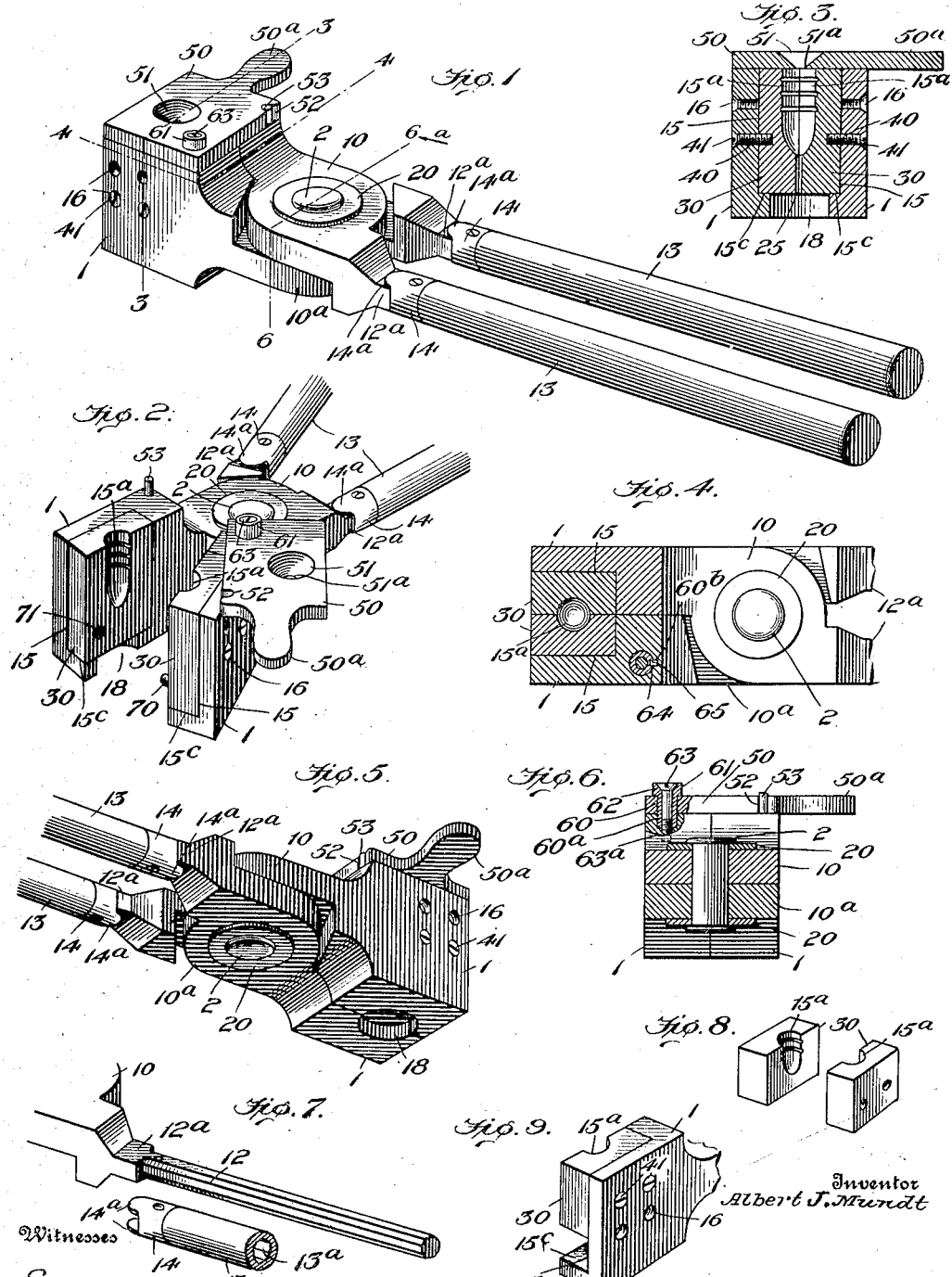

ALBERT J. MUNDT, OF ONTONAGON, MICHIGAN.

BULLET-MOLD.

No. 904,273.  Specification of Letters Patent.  Patented Nov. 17, 1908.

Application filed March 16, 1908. Serial No. 421,478.

*To all whom it may concern:*

Be it known that I, ALBERT J. MUNDT, residing at Ontonagon, in the county of Ontonagon and State of Michigan, have invented a new and Improved Bullet-Mold, of which the following is a specification.

My invention relates to that type of bullet molding appliances having a pair of opposing pivotally connected jaws, having mold sections thereon and handle members for opening and closing the jaws, and has for its object to provide a molding means of the character stated, of a simple and inexpensive construction in which the parts are especially designed for adjustably holding interchangeable mold or die members and adapted for being conveniently applied on and removed from the mold carrying heads or jaws whereby to provide for quickly and accurately shaping different kinds of bullets for fitting the bores of rifles of different makes and calibers, and with the above and other objects in view my invention comprehends the improved construction of mold hereinafter fully described in detail and specifically pointed out in the appended claims, reference being had to the accompanying drawings, in which:

Figure 1, is a perspective view of my improvement, the same being shown as adjusted for molding the bullet. Fig. 2, is a similar view, the jaws or mold heads being opened and the combined cut off and pouring plate swung back. Fig. 3, is a transverse section through the mold heads and taken substantially on the line 3—3 on Fig. 1. Fig. 4, is a horizontal section of the same on the line 4—4 on Fig. 1. Fig. 5, is an inverted perspective view of the closed mold heads. Fig. 6, is a transverse section on the line 6—6, taken through the pivot of the two heads or jaws, looking in the direction of arrow $a$ on Fig. 1. Fig. 7, is a detail perspective view of one of the two part handle members of my appliance. Fig. 8, illustrates a pair of " short " dies. Fig. 9, shows one of the short molds or dies mounted on its head member.

In carrying out my invention I provide a pair of opposing mold or die carrying heads 1—1, which, as is clearly shown in the drawings, are in the nature of a pair of opposing pivotally connected jaws, each of which has an inwardly extended horizontal approximately circular extension 10—10$^a$, the two extensions 10—10$^a$ being disposed in different planes, whereby to ride flatwise on each other and turn on the pivot or fulcrum 2, the ends of which are upset on washers 20, as clearly shown in Fig. 6 by reference to which it will be also seen the flat portions 10—10$^a$ merge, gradually, at the opposite sides, with the heads 1—1.

The inner ends of the extensions 10—10$^a$ terminate in shanks 12—12, preferably octagonal in cross section, for fitting in correspondingly shaped long sockets 13$^a$ in the wooden handles 13, the inner ends of which have metal ferrules 14 secured thereon formed with extensions 14$^a$ that lap over the squared portions 12$^a$ of the shanks 12 as clearly shown in Figs. 1 and 5.

Each mold head 1 has a socket 15 open at the inner, upper and front sides for receiving the rectangular shaped mold members 30. The members 30, which may be of a length equal the depth of the sockets 15, are of such width and thickness to fit flush with the top, front and inner edges of the said sockets 15, and the said molds have the bullet cavities 15$^a$, the shapes of which are made to suit the character of the bullets to be made, but in every instance the receiving or base end of the cavities is flush with the upper edge of the heads 1, as shown.

To provide for properly adjusting the mold members 30, screws 40 having countersunk heads 41 for fitting the countersinks in the heads 1—1 are provided, for engaging the threaded apertures 16—16 in the heads and threaded sockets in the inner walls of the molds 30 as clearly shown in Fig. 3 and to provide for adjustably holding molds of different depths, a plurality of the apertures 16—16 positioned one above the other is provided, see Fig. 3. The adjacent faces of the bottoms 15$^c$ of the sockets 15 have semi-circular recesses 18—18 whereby to form a circular aperture when the two heads are closed together as shown in Fig. 5. This aperture is provided so that when hollow point or express bullets are to be made that the tool that makes the point of a bullet hollow can be applied direct to the bottom of the die or mold, which, under such conditions, has a hole 25 drilled through the bottom, see Fig. 3 in line with the center of the bullet point.

50 designates a cut off and hopper plate which, in practice, is of sufficient strength to withstand its intended uses. This cut off, it will be noticed, is perfectly smooth on its bottom and is of a size to conform with the top of the two jaws or heads when closed, and one end of the plate is extended to form a handle 50ª.

Centrally the plate has a funnel shaped aperture 51 that leads the molten metal, when poured therein, directly into the mold made by the two opposing die members, and since the bottom of the plate is perfectly smooth and the upper edges of the dies are flush with the top of the heads, it follows that after the mold is filled the edges 51ª of the escape aperture 51 act as a cutting means for severing the entrailing molten mass from the mold filling, which is done by swinging the plate 50 outwardly to the position shown in Fig. 2.

To hold the plate for moving in a true plane over the upper face of the molds and their heads, it is necessary that the pivotal connection of the plate be such that the same does not readily wear loose and remain permanently accurate as a pivot. For this purpose the pivotal connection comprises a tubular member 60 that has an enlarged or shouldered head 61 provided with a deep countersunk portion 62 for receiving the beveled head 63 of a long screw 63ª that holds the tubular member 60 in a socket 60ª in the head member 1. So that the plates 50 will turn freely on the tubular pivot 60, the lower end thereof is slotted as at 64 to receive the key 65 that also engages a groove 60ᵇ in the socket 60ª as clearly shown in Fig. 6. Plate 50 is also formed with an edge notch 52 for engaging the stop pin 53 on the head portion that opposes the pivot pin carrying head portion and when the said plate 50 is swung over to the position shown in Fig. 1, by reason of its slipping over the pin 53, it then locks the two head portions 1—1 together during the operation of pouring the metal. To further guide the mold heads to bring them to a true closure position, one of the heads has a tenon 70 for engaging a socket 71 in the opposite head.

From the foregoing, taken in connection with the drawings the complete construction, the manner of use and the advantages of my invention will be readily understood by those skilled in the art to which it appertains.

Having thus described my invention what I claim and desire to secure by Letters Patent, is:—

1. A bullet mold, comprising two pivotally connected heads, each head having a recess open at the top, front and sides, each of said heads having a plurality of sets of horizontal threaded apertures combined with mold members shaped to endwise and crosswise fill the recesses in the heads, said members each having a single set of horizontal threaded sockets and securing screws for engaging the aforesaid threaded apertures and sockets.

2. The combination with the pivotally connected opposing heads, each having an open socket or recess on the adjacent faces, a mold that fills in the said open socket, means for adjustably and detachably mounting the mold in the said socket, one of the heads having a stop stud, the other head having a socket, a tubular shank that fits said socket, said shank being slotted lengthwise, a key for fastening the shank in the socket, said shank having a headed portion, a plate pivotally connected on the headed portion of the shank to swing in the horizontal plane on the top of the heads and the molds, said plate having a notch for engaging the pin 60 and having a pouring aperture.

ALBERT J. MUNDT.

Witnesses:
JOHN GARVIN,
LEON E. GARVIN.